(12) United States Patent
Purohit

(10) Patent No.: US 9,021,330 B2
(45) Date of Patent: Apr. 28, 2015

(54) SYSTEM AND METHOD FOR MULTI-CHANNEL FEC ENCODING AND TRANSMISSION OF DATA

(75) Inventor: Vinay D. Purohit, Branchburg, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 143 days.

(21) Appl. No.: 13/476,606

(22) Filed: May 21, 2012

(65) Prior Publication Data

US 2013/0311848 A1 Nov. 21, 2013

(51) Int. Cl.
*H03M 13/00* (2006.01)
*H04L 1/00* (2006.01)

(52) U.S. Cl.
CPC ............ *H04L 1/0057* (2013.01); *H04L 1/0061* (2013.01); *H04L 1/0071* (2013.01)
USPC ......................................................... 714/758

(58) Field of Classification Search
CPC ...................................................... H03M 13/09
USPC .......... 714/758, 746, 774, 747, 790, 784, 755
See application file for complete search history.

(56) References Cited

U.S. PATENT DOCUMENTS

| | | | |
|---|---|---|---|
| 5,742,361 A | 4/1998 | Nakase et al. | |
| 6,138,147 A * | 10/2000 | Weaver et al. | 709/206 |
| 6,173,429 B1 * | 1/2001 | Twitchell et al. | 714/746 |
| 6,493,873 B1 | 12/2002 | Williams | |
| 6,598,200 B1 | 7/2003 | Greenwood et al. | |
| 7,085,306 B1 | 8/2006 | Voldman et al. | |
| 7,116,652 B2 | 10/2006 | Lozano | |
| 7,577,881 B1 * | 8/2009 | Shridhar et al. | 714/702 |
| 7,724,676 B2 | 5/2010 | Gerstel et al. | |
| 2002/0051461 A1 | 5/2002 | Calderone | |
| 2003/0210663 A1 | 11/2003 | Everson et al. | |
| 2004/0240415 A1 | 12/2004 | Lane | |
| 2005/0031047 A1 | 2/2005 | Maltsev et al. | |
| 2005/0233710 A1 | 10/2005 | Lakkis et al. | |
| 2006/0008085 A1 | 1/2006 | Matsuo | |
| 2006/0034164 A1 | 2/2006 | Ozluturk | |
| 2006/0269282 A1 | 11/2006 | Gerstel | |
| 2007/0049200 A1 | 3/2007 | Nagai | |

(Continued)

FOREIGN PATENT DOCUMENTS

| | | |
|---|---|---|
| EP | 0 642 228 A2 | 3/1995 |
| EP | 0 721 267 A2 | 7/1996 |

(Continued)

OTHER PUBLICATIONS

Kholaif A M et al: "DRKH: A Power Efficient Encryption Protocol for Wireless Devices," Local Computer Networks, 2005. $30^{th}$ Anniversary. The IEEE Conference on Sydney, Australia Nov. 15-27, 2005, Piscataway, NJ, USA, IEEE, Nov. 15, 2005, pp. 822-829, XP010859299.

(Continued)

*Primary Examiner* — Fritz Alphonse
(74) *Attorney, Agent, or Firm* — Wall & Tong, LLP

(57) ABSTRACT

A mechanism for resilient transmission of a data stream D by associating sequential data stream portions with respective elements within an array of elements, defining and FEC encoding each of a plurality of element groups comprising non-sequential data stream portions, dividing the sequence of FEC blocks into a plurality of substreams, and associating each substream with a respective transmission channel.

22 Claims, 6 Drawing Sheets

(56) References Cited

U.S. PATENT DOCUMENTS

| | | |
|---|---|---|
| 2007/0147251 A1 | 6/2007 | Monsen |
| 2008/0112312 A1 | 5/2008 | Hermsmeyer et al. |
| 2008/0133935 A1 | 6/2008 | Elovici et al. |
| 2008/0232298 A1 | 9/2008 | Kim et al. |
| 2008/0291984 A1* | 11/2008 | Heise et al. ............ 375/219 |
| 2009/0086759 A1 | 4/2009 | Heise et al. |
| 2009/0161592 A1 | 6/2009 | So |
| 2009/0175278 A1 | 7/2009 | Harel et al. |
| 2009/0274240 A1 | 11/2009 | Oshima |
| 2009/0290659 A1 | 11/2009 | Petrovic et al. |
| 2010/0021166 A1 | 1/2010 | Way |
| 2010/0086066 A1 | 4/2010 | Chrabieh et al. |
| 2010/0124332 A1 | 5/2010 | Arena |
| 2010/0150211 A1 | 6/2010 | Gerakoulis et al. |
| 2010/0195561 A1 | 8/2010 | Yamaguchi et al. |
| 2010/0211787 A1 | 8/2010 | Bukshpun et al. |
| 2010/0211854 A1 | 8/2010 | Wu et al. |
| 2010/0272190 A1 | 10/2010 | Kim et al. |
| 2011/0032892 A1 | 2/2011 | Bahl et al. |
| 2011/0128853 A1 | 6/2011 | Nishimura |
| 2011/0185168 A1 | 7/2011 | Schlacht et al. |
| 2012/0163178 A1 | 6/2012 | Gordon et al. |
| 2012/0182948 A1 | 7/2012 | Huang et al. |
| 2012/0219066 A1 | 8/2012 | Amonou et al. |
| 2013/0039251 A1 | 2/2013 | Wilkinson et al. |
| 2013/0182690 A1 | 7/2013 | Kovacs et al. |

FOREIGN PATENT DOCUMENTS

| | | |
|---|---|---|
| EP | 1 921 754 A1 | 5/2008 |
| EP | 1 995 901 A2 | 11/2008 |
| EP | 2 093 957 A1 | 8/2009 |
| EP | 2 264 931 A1 | 12/2010 |
| JP | H07312593 (A) | 11/1995 |
| JP | H0973565 (A) | 3/1997 |
| JP | H1065652 (A) | 3/1998 |
| JP | 2003198416 A | 7/2003 |
| JP | 2004056569 A | 2/2004 |
| WO | WO 02/05506 A2 | 1/2002 |
| WO | WO 02/078211 A2 | 10/2002 |
| WO | WO 02/093779 A2 | 11/2002 |
| WO | WO 2007/149961 A1 | 12/2007 |
| WO | WO 2011/038272 A1 | 3/2011 |

OTHER PUBLICATIONS

The International Search Report and the Written Opinion of the International Searching Authority, or the Declaration in PCT/US2012/026437, mailed Jun. 26, 2012, Alcatel-Lucent USA Inc., Applicant, 14 pages.

The International Search Report and the Written Opinion of the International Searching Authority, or the Declaration in PCT/US2012/034059, mailed Jun. 27, 2012, Alcatel-Lucent USA Inc., Applicant, 15 pages.

The International Search Report and the Written Opinion of the International Searching Authority, or the Declaration in PCT/US2012/038050, mailed Jul. 3, 2012, Alcatel-Lucent USA Inc., Applicant, 12 pages.

The International Search Report and Written Opinion of the International Searching Authority, or the Declaration in PCT/2013/040126, mailed Aug. 1, 2013, Alcatel Lucent USA Inc, Applicant, 10 pages.

Junichi ABE et al., "Bandwith Decomposition Employing Editing Technique for High Frequency Utilization Efficiency", Technical Reports of IEICE (Institute of Electronics, Information and Communication Engineers), Dec. 10, 2009, vol. 109, No. 340, pp. 7-12.

* cited by examiner

300

SYSTEM AND METHOD FOR MULTI-CHANNEL FEC ENCODING AND TRANSMISSION OF DATA

CROSS REFERENCE TO RELATED APPLICATIONS

This application is related to U.S. patent application Ser. No. 13/471,504, filed May 15, 2012, entitled "SYSTEM AND METHOD PROVIDING RESILIENT DATA TRANSMISSION VIA SPECTRAL FRAGMENTS", which is incorporated herein by reference in its entirety.

TECHNICAL FIELD

The invention relates generally to communication networks and, more specifically, but not exclusively, to point-to-point and point-to-multipoint communication networks and backhaul links.

BACKGROUND

Traditional wireless systems assume the availability of a contiguous block of spectrum with bandwidth proportional to the amount of data to be transmitted. Transmission systems are thus frequently designed for worst-case bandwidth requirements with the typical or average use-case, in some instances, requiring much less bandwidth (i.e., spectrum). Within the context of satellite communications systems and other point-to-point communications systems, available spectrum allocated to customers may become fragmented over time, which leads to unused blocks between allocated blocks of spectrum. When the blocks of unused spectrum are too small, it is necessary to reallocate spectrum among customers or "move" a customer from existing spectral allocation to a new spectral allocation so that the unused blocks of spectrum may be coalesced into a single spectral region. Unfortunately, such reallocation is very disruptive.

In addition, various existing techniques for transmitting data exhibit susceptibility to interference and/or other error sources improved resiliency is desirable, along with improved spectral efficiency.

SUMMARY

Various deficiencies of the prior art are addressed by the present invention of systems, methods and apparatus for resilient transmission of a data stream D by associating sequential data stream portions with respective elements within an array of elements, defining and FEC encoding each of a plurality of element groups comprising non-sequential data stream portions, dividing the sequence of FEC blocks into a plurality of substreams, and associating each substream with a respective transmission channel.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of a satellite communications system. However, those skilled in the art and informed by the teachings herein will realize that the invention is also applicable to any system benefiting from flexible spectral allocation, such as microwave communications systems, wireless communications systems and the like. Moreover, although primarily described within the context of a point-to-point communications system, the various embodiments find applicability within the context of point-to-multipoint communications systems as well.

The various embodiments address the general problem of providing reliable transmission of a data stream, D, from source node A to destination node B. D may be any packetized data, including Ethernet/IP, or may be serialized data over standard interfaces like RS-232, RS-422, EIA-530, DVB-ASI, MPEG, IP and the like.

Generally speaking, various embodiments provide for transmitter apparatus in which, for a data stream D to be transmitted, the following processes are performed: (1) encoding the data stream D to provide a sequence of data blocks; (2) arranging the encoded blocks in memory in a particular order (i.e., a packing and/or transmit order such as described below with respect to FIG. 2); and (3) segmenting or slicing the arranged blocks into N portions, where each of the N portions is transmitted by a respective one of P different transmission links. It is noted that the amount of data transmitted on a physical link is typically selected to be proportional to the throughput of that link. In various embodiments where all P links are of equal capacity, each link may be assigned an equal portion of the original stream D. In various embodiments, the use of multiple links provides a natural interleaving of data that is advantageous to traditional time-domain interleaving used in other schemes.

Similarly, various embodiments provide for receiver apparatus in which, for a data stream D to be received, the reverse of the above-described processes are performed, such as receiving data via the various links, recombining the various portions, de-interleaving the various data blocks, decoding the interleaved data blocks and so on to extract therefrom the data stream D. Various embodiments provide mechanisms to convey between transmitter(s) and receivers(s) the encoding, interleave, link and other parameters, optional encryption parameters and so on.

Various embodiments are implemented within the context of a satellite communications system. However, those skilled in the art and informed by the teachings herein will realize that the invention is also applicable to any system benefiting from flexible spectral allocation, such as microwave communications systems, wireless communications systems and the like.

Figure 1:
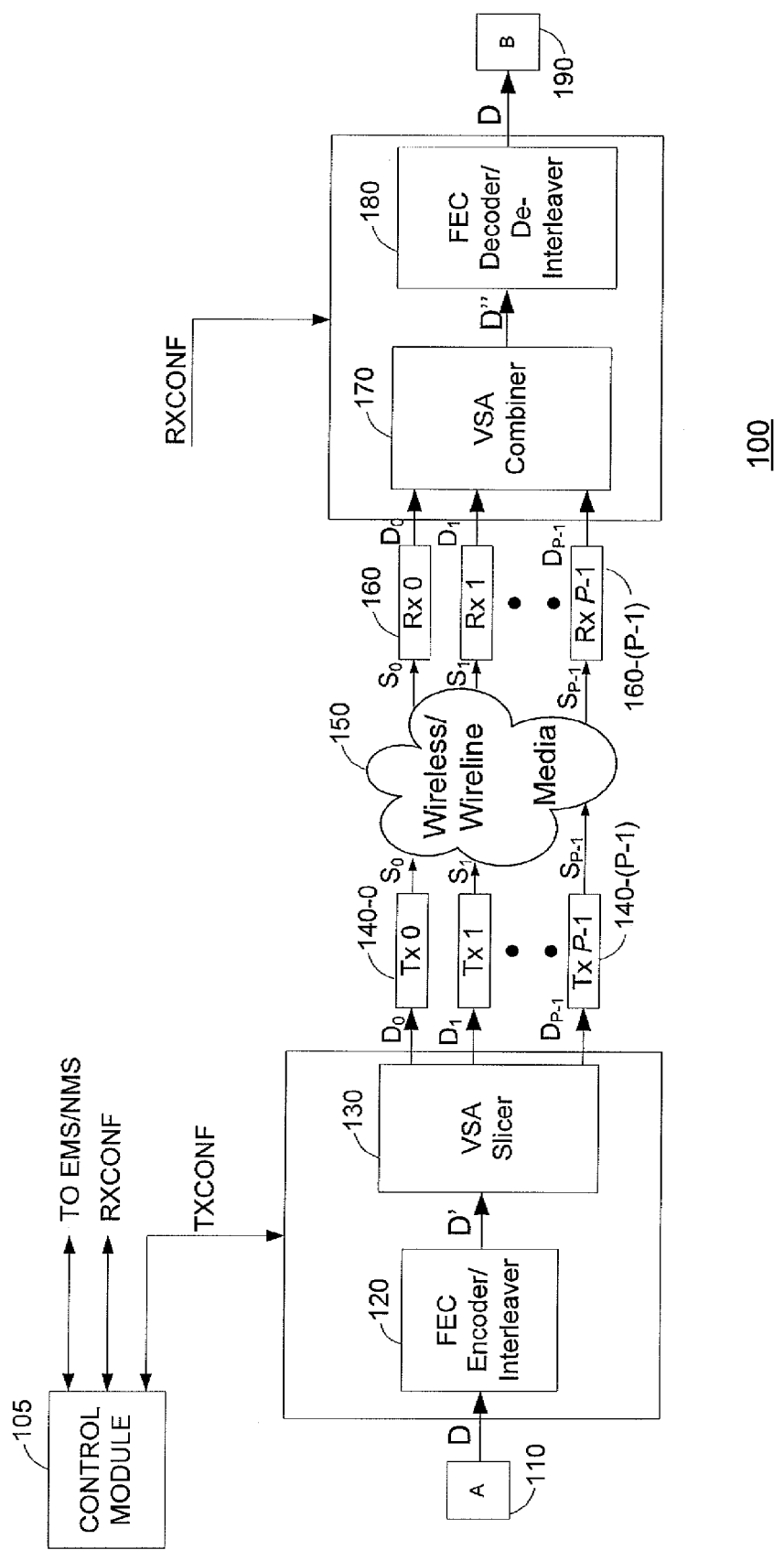
FIG. 1 depicts a high level block diagram of a system benefiting from various embodiments.

FIG. 1 depicts a high level block diagram of a system benefiting from various embodiments. Specifically, the system 100 of FIG. 1 is adapted to transmit a data stream D from a source 110 toward a destination 190. The system 100 includes a forward error correction (FEC) encoder/interleaver 120, a slicer 130, a plurality of transmitter modules 140, one or more types of transmission media 150 such as wireless network, wireline network and so on, a plurality of receiver modules 160, a combiner 170, and an FEC decoder/de-interleaver 180. An optional control module 105 may also be used within the context of the system 100.

The FEC encoder/interleaver 120 receives the data stream D from, illustratively, a source 110 such as a router, computer network element, satellite downlink system, optical transport network and so on. Generally speaking, the data stream D is conveyed to the FEC encoder/interleaver 120 via any technology or mechanism suitable for this purpose. The FEC encoder/interleaver 120 operates to process the data stream D by (1) FEC encoding the data stream D to provide thereby a plurality of FEC encoded data blocks, and (2) storing the FEC encoded data blocks in, illustratively, a memory array of N rows and M columns, such as described in more detail below with respect to FIG. 2. The FEC encoder/interleaver 120 provides an FEC encoded and interleaved data stream D' to the slicer 130.

The slicer 170 slices, demultiplexes and/or divides the encoded and interleaved data stream D' into a plurality P of substreams (e.g., $D_0, D_1, \ldots D_{P-1}$), where P corresponds to a number of links and/or spectral fragments. In various embodiments, more or fewer than P links and/or spectral fragments may be used. Each of the substreams $D_0, D_1, \ldots D_{P-1}$ is coupled to a respective transmitter module 140 (e.g., $140_0, 140_1, \ldots 140_{P-1}$).

Each of the transmitter modules 140 modulates its respective substream (e.g., $D_0, D_1, \ldots D_{P-1}$) to provide corresponding modulated signals (e.g., $S_0, S_1, \ldots S_{P-1}$) for transmission to a corresponding receiver module 160 (e.g., $160_0, 160_1, \ldots 160_{P-1}$) via a transmission channel through an appropriate transmission media 150, such as wireless network, wireline network and so on.

Each transmitter module 140 may provide additional forward error correction (FEC) processing and various other processing. Data to be transmitted may be provided as a stream of data packets D, such as 188-byte transport stream (TS) packets, 64-1500 bytes Ethernet packets and so on. The specific packet structure, data conveyed within a packet structure and so on is readily adapted to the various embodiments described herein.

The transmitter modules 140 may include modulation, error correction and/or other characteristics that differ from one transmitter module to another, such as the characteristics of waveform type, constellation maps, forward error correction (FEC) settings, intended transmission medium and so on. Each transmitter module 140 may be optimized according to a specific type of traffic (e.g., streaming media, non-streaming data and the like), the specific channel conditions associated with its corresponding spectral fragment and/or other criteria.

Each of the receiver modules 160 demodulates its respective received signal (e.g., $S_0, S_1, \ldots S_{P-1}$) to extract therefrom corresponding demodulated substreams (e.g., $D_0, D_1, \ldots D_{P-1}$) to be further processed by the combiner 170. The receiver modules 160 may include modulation, error correction and/or other characteristics that differ from one receiver module to another, such as the characteristics of waveform type, constellation maps, forward error correction (FEC) settings, transmission medium and so on. Each receiver module 160 may be optimized according to a specific type of traffic (e.g., streaming media, non-streaming data and the like), the specific channel conditions associated with its corresponding spectral fragment and/or other criteria.

Generally speaking, each transmitter module 140 may be paired with a corresponding receiver module 160 to establish thereby a communications channel for propagating a substream or stream segment through a homogeneous or heterogeneous transmission media 150. The transmitter modules 140, receiver modules 160 and transmission media 150 may implement one or more point-to-point communications systems (e.g., satellite links, microwave links, optical links and the like), one or more point-to-multipoint communications systems (e.g., packet-switched network) and so on.

The transmission media 150 may include satellite communication systems, microwave communications systems and/or other high frequency point-to-point or point-to-multipoint systems. In these embodiments, the transmitter modules 140 and receiver modules 160 include the necessary circuitry, functional elements and the like to perform various gnome processes such as signal buffering, power amplification, up conversion, down conversion, frequency/code modulation and so on.

While shown in FIG. 1 as a one to one pairing, it is contemplated that one or more transmitter modules 140 may be paired with one or more receiver modules 160 depending on the type of configuration desired, the nature of the transmission media 150 utilized and so on. Generally speaking, the physical transmission links forming some or all of transmission media 150 may comprise any wireline (fiber/DSL) or wireless links such as 3G, 4g, Long Term Evolution (LTE), Wi-Fi, WiMAX, 802.11x, microwave or, generally speaking, any type of communications or telecommunications network capable of carrying packetized data.

The combiner 170 receives the demodulated substreams from the various receiver modules 160, combines the substreams and provides a resulting FEC encoded/interleaved input data stream D" to the FEC decoder/de-interleaver 180. Generally speaking, the combiner 170 performs a function inverse to that of the slicer 130.

The FEC decoder/de-interleaver 180 processes the FEC encoded/interleaved input data stream D" received from the combiner 170 to extract therefrom the original de-interleaved and decoded data stream D, which is then provided to the destination 190. Generally speaking, the FEC decoder/de-interleaver 180 performs a function inverse to that of the FEC encoder/interleaver 120.

Optional control module 105 interacts with an element management system (EMS), a network management system (NMS) and/or other management or control system suitable for use in managing network elements implementing the functions described herein with respect to FIG. 1. The control module 105 may be used to configure various encoders, interleavers, slicers, transmitter modules, receiver modules, combiners, decoders, de-interleavers and/or other circuitry within the elements described herein with respect FIG. 1. Moreover, the control module 105 may be remotely located with respect to the elements controlled thereby, located proximate transmission circuitry, located proximate receiver circuitry and so on.

The control module 105 may be implemented as a general purpose computer programmed to perform specific control functions such as described herein. In one embodiment, control module 105 adapts the configuration and/or operation of the transmitter related functional elements and receiver related functional elements via, respectively, a first control signal TXCONF and a second control signal RXCONF. In this embodiment, multiple control signals may be provided in the case of multiple transmitters and receivers.

In various embodiments, the system 100 of FIG. 1 utilizes the virtual spectral aggregation (VSA) techniques described in more detail with respect to U.S. patent application Ser. No. 13/471,504, filed May 15, 2012, entitled "SYSTEM AND METHOD PROVIDING RESILIENT DATA TRANSMISSION VIA SPECTRAL FRAGMENTS" which is incorporated herein by reference in its entirety.

For example, in various embodiments of the invention, some of the transmitter modules 140 are adapted to transmit their respective segments or slices via spectral regions or fragments within a spectral region associated with one or more carrier signals. The carrier signals may comprise uplink carrier signals associated with one or more transponders of a satellite, one or more transponders of multiple satellites, terrestrial microwave links and so on.

In some embodiments, slices or segments are conveyed via multiple transmitter modules 140 to provide thereby redundant transmission of data. In these embodiments, multiple receiver modules 160 operate to select a preferred received signal (or portions thereof), such preferences be based on bit error rate, channel quality and/or other parameters.

Figure 2:
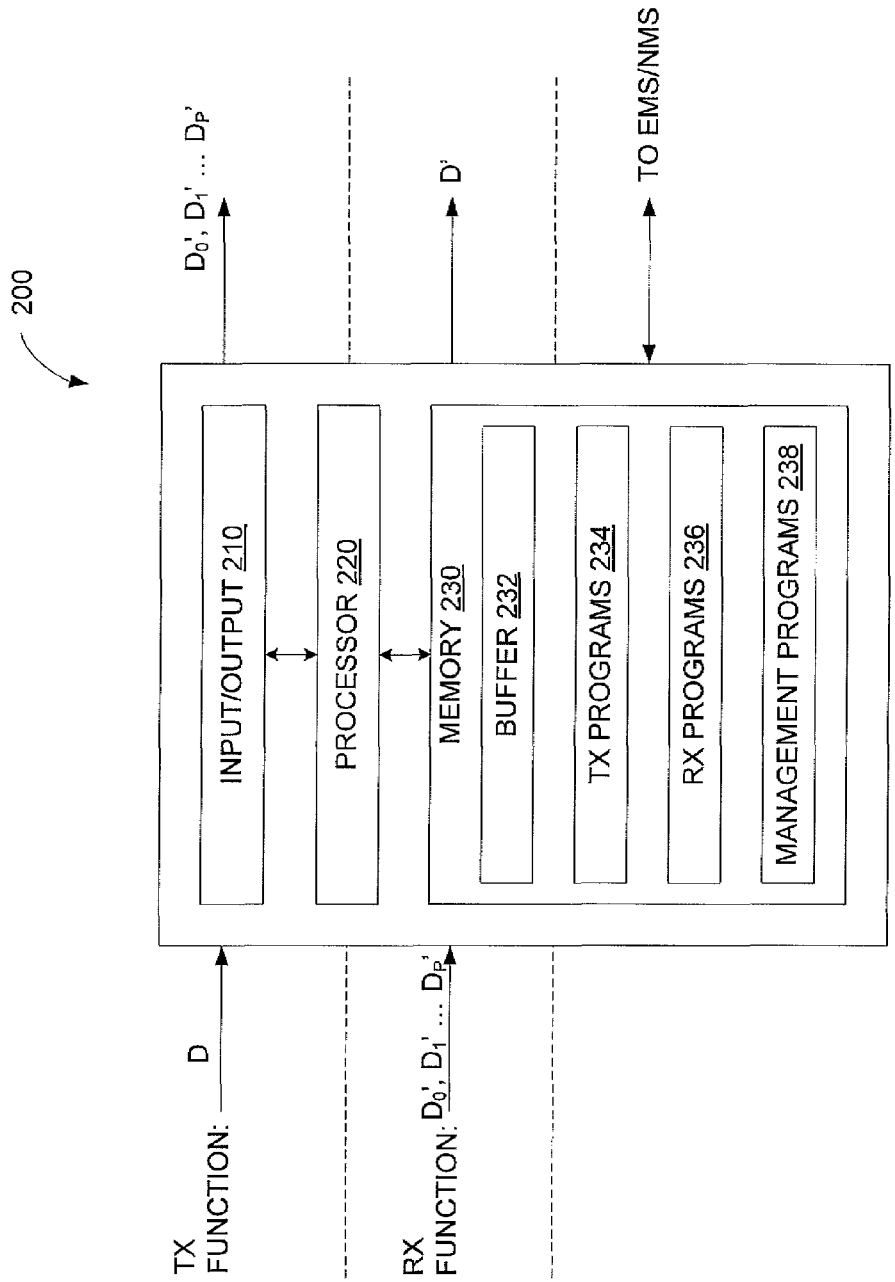
FIG. 2 depicts a high-level block diagram of a general purpose computing device suitable for use in various embodiments.

FIG. 2 depicts a high-level block diagram of a general purpose computing device suitable for use in various embodiments. For example, the computing device 200 depicted in FIG. 2 may be used to execute programs suitable for implementing various transmitter processing functions, receiver processing functions and/or management processing functions as will be described herein.

As depicted in FIG. 2, the computing device 200 includes input/output (I/O) circuitry 210, a processor 220 and memory 230. The processor 220 is coupled to each of the I/O circuitry 210 and memory 230.

The memory 230 is depicted as including buffers 232, transmitter (TX) programs 234, receiver (RX) programs 236 and or management programs 238. The specific programs stored in memory 230 depend upon the function implemented using the computing device 200.

In one embodiment, the FEC encoder/interleaver 120 described above with respect to FIG. 1 is implemented using a computing device such as the computing device 200 of FIG. 2. Specifically, the processor 220 executes the various functions described above with respect to the encoder/interleaver 120. In this embodiment the I/O circuits 210 receive the input data stream D from a data source (e.g., data source 110) an FEC encoded/interleaved input data stream D' to the slicer 130.

In one embodiment, the slicer 130 described above with respect to FIG. 1 is implemented using a computing device such as the computing device 200 of FIG. 2. Specifically, the processor 220 executes the various functions described above with respect to the slicer 130. In this embodiment, the I/O circuits 210 receive the FEC encoded/interleaved input data stream D' from the FEC encoder/interleaver 120 and provide the P substreams to their corresponding transmission modules 140.

In one embodiment, the combiner 170 described above with respect to FIG. 1 is implemented using a computing device such as the computing device 200 of FIG. 2. Specifically, the processor 220 executes the various functions described above with respect to the combiner 170. In this embodiment, the I/O circuits 210 receive the P substreams from their corresponding receiver modules 160 and provide the combined or received FEC encoded/interleaved input data stream D" to the FEC decoder/de-interleaver 180.

In one embodiment, the FEC decoder/de-interleaver 180 described above with respect to FIG. 1 is implemented using a computing device such as the computing device 200 of FIG. 2. Specifically, the processor 220 executes the various functions described above with respect to the decoder/de-interleaver 180. In this embodiment the I/O circuits 210 receive the combined or received FEC encoded/interleaved input data stream D" from the combiner 170 and provide therefrom the de-interleaved and decoded data stream D to the destination 190.

In one embodiment, an optional control module 105 described above with respect to FIG. 1 is implemented using a computing device such as the computing device 200 of FIG. 2.

Although primarily depicted and described as having specific types and arrangements of components, it will be appreciated that any other suitable types and/or arrangements of components may be used for computing device 200. The computing device 200 may be implemented in any manner suitable for implementing the various functions described herein.

It will be appreciated that computer 200 depicted in FIG. 2 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Figure 3:
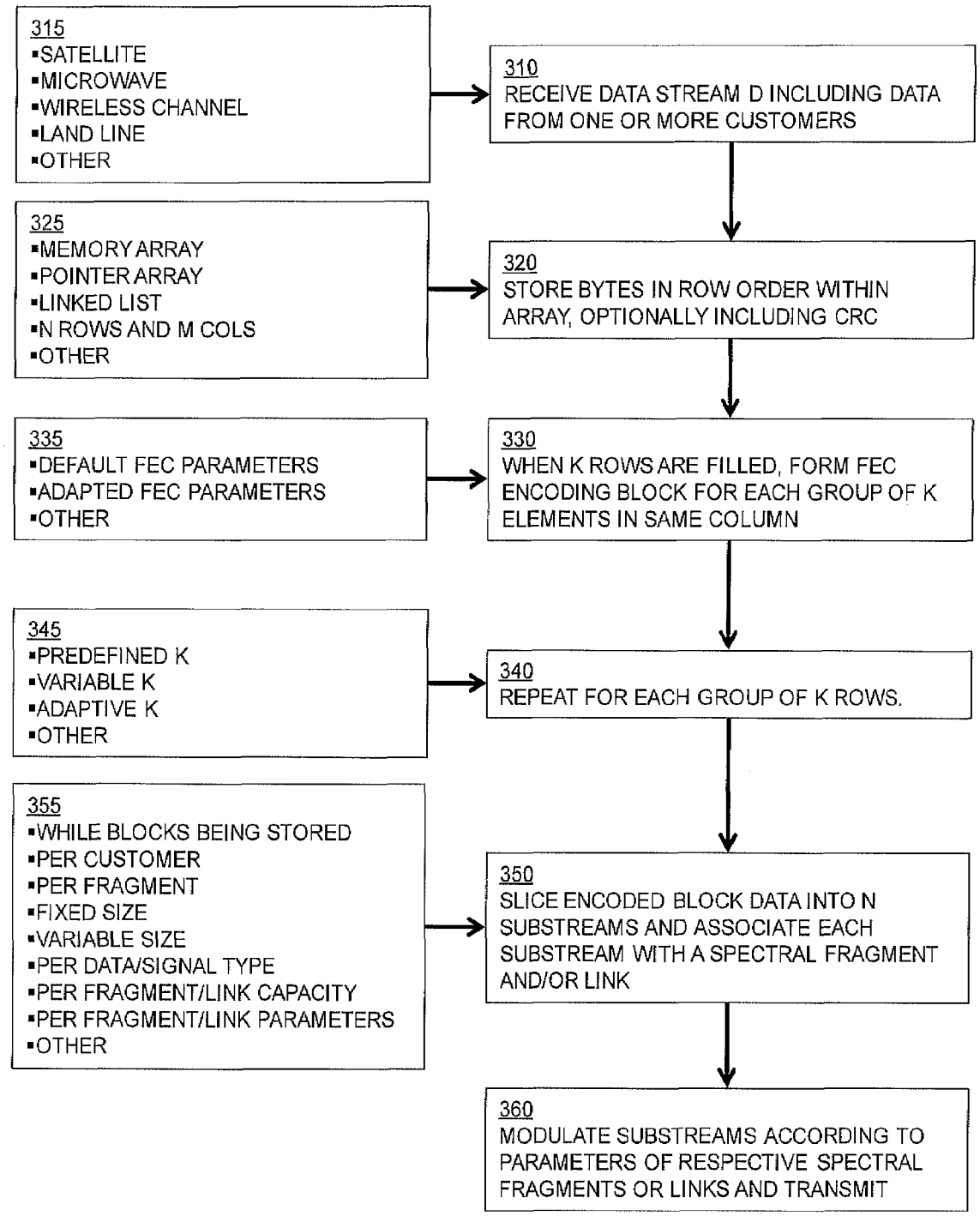
FIG. 3 depicts a flow diagram of a method according to one embodiment.
Figure 4:
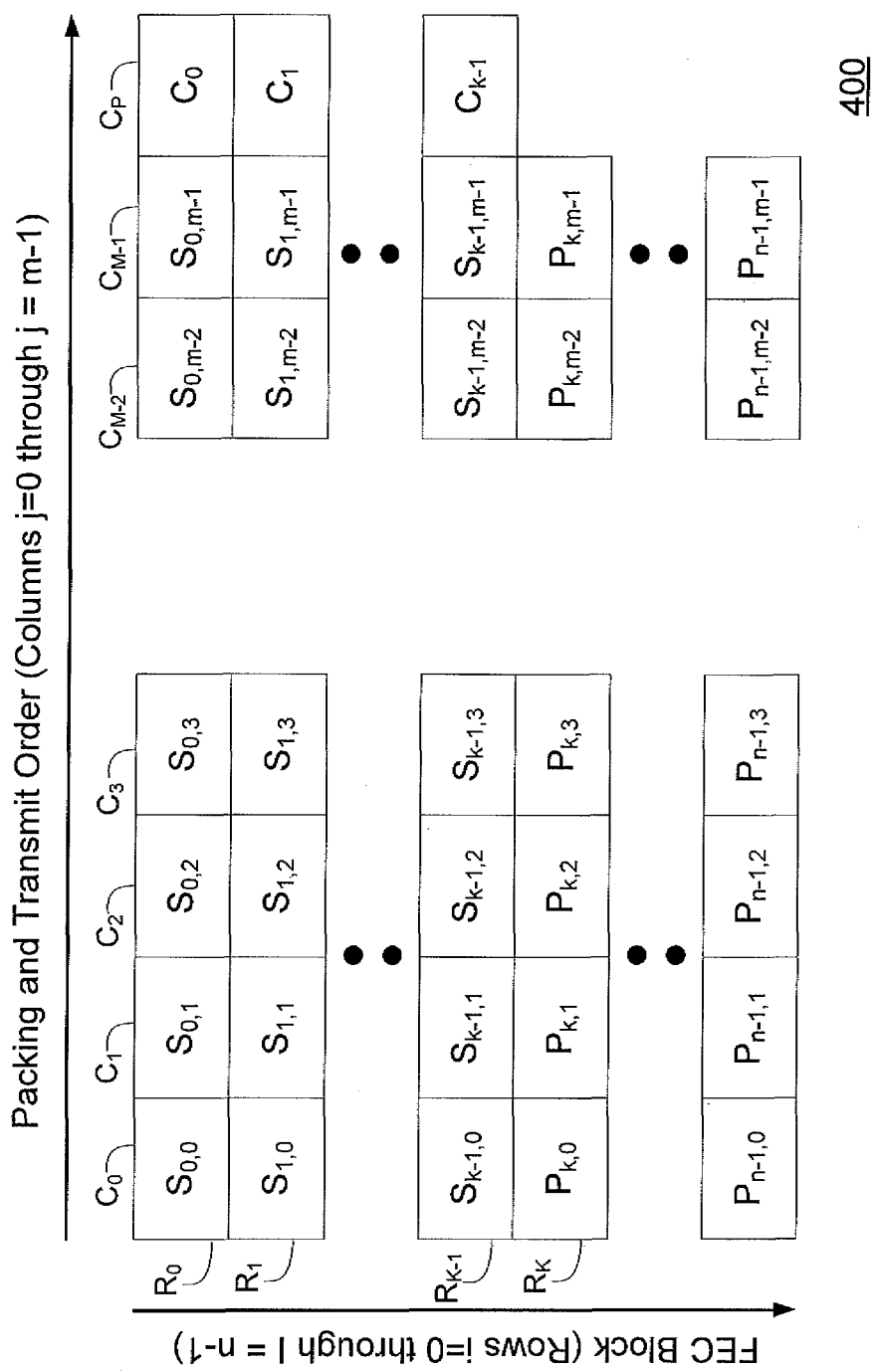
FIG. 4 depicts a graphical representation of an interleaved storage array useful in understanding the various embodiments.

FIG. 3 depicts a flow diagram of a method according to one embodiment and suitable for processing a data stream D for transmission, such as described above with respect to FIG. 1. FIG. 4 depicts a graphical representation of an interleaved storage array useful in understanding the various embodiments. These two figures will be described together within the context of a particular embodiment.

At step 310, one or more data streams are received from one or more customers. Referring to box 315, the one or more data streams may be received via satellite link, microwave link, wireless channel, wireline channel and/or other means.

At step 320, data portions such as words (comprised of one or more bytes) from the received data stream D are stored in a row or other defined order within an array, where a circular redundancy check (CRC) value is optionally associated with one or more of the rows or other portion of a defined order. Referring to box 325, the array may comprise a defined area of memory, an array of pointers (such as pointing into an input buffer), a linked list or other storage mechanism. In a particular embodiment described herein, a memory array comprising N rows by M columns is explained in more detail.

At step 330, when K rows are filled, a FEC coding block is formed for each group of K elements in the same column. Referring to box 335, the FEC encoding may be performed using default FEC parameters or FEC parameters adapted in response to various criteria, such as transmission channel noise levels and/or compatibility considerations, receiver compatibility considerations, underlying encoding/encryption compatibility considerations and so on. Moreover, the circular redundancy check (CRC) parameter may be calculated as part of the FEC encoding process and periodically injected into the sequence of encoded data blocks to enhance error detection/correction capabilities.

At step 340, steps 310-330 are repeated for a next group of K rows. Referring to box 345, K may be predefined, variable, adaptive based upon some condition or determined in some other manner. Steps 310-340 operates to generate a sequence of FEC encoded blocks which are then provided to the slicer 130 for further processing. The operation of steps 310-340 will be further described below with respect to FIG. 4.

At step 350, the FEC encoded block data is sliced into a plurality (illustratively P) of stream segments and/or substreams, each of the stream segments and/or substreams being associated with a respective spectral fragment and/or link as discussed herein with respect to the various embodiments. Referring to box 355, the stream segments and/or substreams may be defined according to customer, available spectral fragments of fixed size or variable size, data type or signal type, spectral fragment or link capacity, spectral fragment or link parameters and/or other parameters or criteria.

At step 360, the stream segments and/or substreams are modulated according to the appropriate modulation parameters, bandwidth allocations, priority levels and/or other parameters for their respective spectral fragments or links, and then transmits by those respective spectral fragments or links such as via a corresponding transmit module.

FIG. 4 depicts a graphical representation of an interleaved storage array useful in understanding the various embodiments. Specifically, FIG. 4 depicts an array 400 of memory elements having n rows and m columns, where a byte stored at a row i and a column j is designated $S_{ij}$.

In one embodiment, the depicted array 400 is populated by operation of the FEC encoder/interleaver 120 described above with respect to FIG. 1. Various embodiments may be utilized to store data according to the depicted array 400. Similarly, the structure of the depicted array 400 may also be adapted according to various embodiments. Similarly, the FEC decoder/de-interleaver 180 performs substantially the inverse operation as described herein.

For purposes of this discussion, it is assumed that data bytes associated with a data stream D are processed by a FEC encoder/interleaver and stored in an N by M array as depicted. To ensure low latency, the incoming data bytes may also be simultaneously forwarded to the slicer 130 (optionally including a periodically injected circular redundancy check (CRC) byte).

In one embodiment, the FEC encoder/interleaver 120 stores incoming data bytes from the data stream D to the array in row order, illustratively, row 0 is filled first, row 1 next, and so on until row k−1 is filled. Optionally, a circular redundancy check (CRC) byte is periodically calculated for each row of bytes and stored in the array, illustratively depicted as the last column of each row. The purpose of the CRC (denoted in the array as Ci) is to allow receivers such as receiver modules 160 to perform a quick CRC check on the packet in that row and allow use of all the data bytes of that row without incurring the delay associated with first filling the de-interleaver array and then computing parity for error correction purposes.

After the elements in row k−1 are filled with data bytes and (optionally) a CRC byte, FEC encoding is applied individually to each of the m columns. That is, those data bytes in rows 0-k that are within the same column m are processed together using FEC encoding to form thereby FEC block. That is, FEC block is formed using the block of bytes in each column. In some systems, only a subset of k rows (e.g., k') may be filled and the remainder z=k−k' rows nulled or zero padded.

Referring to FIG. 4, it can be seen that a first FEC block denoted as $P_{k,0}$ is formed in the first column (j=0) by applying FEC encoding to the columnar-wise elements i=0 through i=k−1 (i.e.; $S_{0,0}, S_{1,0} \ldots S_{k-1,0}$). Similarly, a second FEC block denoted as $P_{k,1}$ is formed in the second column (j=1) by applying FEC encoding to the columnar-wise elements i=0 through i=k−1 ($S_{0,1}, S_{1,1} \ldots S_{k-1,1}$), a third FEC block denoted as $P_{k,2}$ is formed in the third column (j=2) by applying FEC encoding to the columnar-wise elements i=0 through i=k−1 ($S_{0,2}, S_{1,2} \ldots S_{k-1,2}$;) and so on through column j=m−1.

The above processing steps may be implemented for each of K rows within the array. Portions of the array may also be overridden as the corresponding FEC blocks are transmitted to the slicer 130.

In various embodiments, a systematic block FEC scheme is provided (i.e., one that preserves the original input bytes in its output). Such schemes include, illustratively, LDPC or BCH, or other FEC schemes that handle erasures may also be applied to the user bytes available in every column. The output parity bytes of the FEC encoder fill up the remainder N−K rows of every column. In various embodiments, non-systematic FEC codes may be used if, illustratively, low transmission latency is not a requirement.

In various embodiments, transmission of bytes takes place row-wise. In various embodiments, transmission of user data bytes to the slicer 130 and storage in the interleaver array at location Si,j happen simultaneously—if using systematic FEC codes—thus incurring no latency. Original data bytes (Si,j) are transmitted in the same order in which they are stored in the array. For non-systematic FEC codes, transmission of bytes towards the VSA slicer commences only after the encoder has generated its output for each input column. Rows with zero-padding bytes are optionally not transmitted.

In various embodiments, once data bytes and associated optional CRC bytes from the first K' rows are transmitted, transmission of bytes from rows (starting from row K) containing parity codes commences. Thus bytes in row K are transmitted first, and then row K+1, and so on.

Data bytes of a row effectively constitute the payload of a packet. The interleaver may be constructed to provide that (1) The row size, M (which is the number of user data bytes per row+one optional CRC byte) is equal to the payload size of the packets generated by the VSA slicer; and (2) The slicer is synchronized such that it assigns a predicable sequence number for the packet corresponding to the first row of the interleaver.

In various embodiments, due to multiple transmission links, different rows of the interleaver may be transmitted across multiple transmission links, thereby effectively providing dual frequency and time interleaving of data. Maximal interleaving is achieved with transmission links of equal capacity where the rows of the interleaver get distributed across the transmission links in a round-robin manner. If the links are unequal, the distribution is proportionate to the available bandwidth per link.

In various embodiments, where low transmission latency may not be a key requirement, the rows (K' rows of user data and N−K rows of parity bytes) may be transmitted in a non-sequential manner to provide further interleaving. In various embodiments, row #0 is the first row transmitted.

Various embodiments contemplate that k rows of data are processed within the context of FEC coding of each of the m columns (or m+1 columns if CRC data occupies an element in a row). A superblock may be defined as including the FEC block data associated with k rows. In various embodiments an array may be sized to store only a few superblocks, with the array memory being reused for subsequent superblocks. In various embodiments, the superblock size is adapted in response to channel optimization, data type and/or other parameters. Such superblocks may also be defined within the context of other array structures.

In various embodiments, the value of M is chosen to match the payload size of the packets sent over the transmission link. This may not be necessary for all link aggregation techniques, but it certainly helps ensure interleaver synchronization with the VSA transmission technique. Various synchronization schemes in addition to those described herein may be used within the context of the various embodiments.

Figure 5:
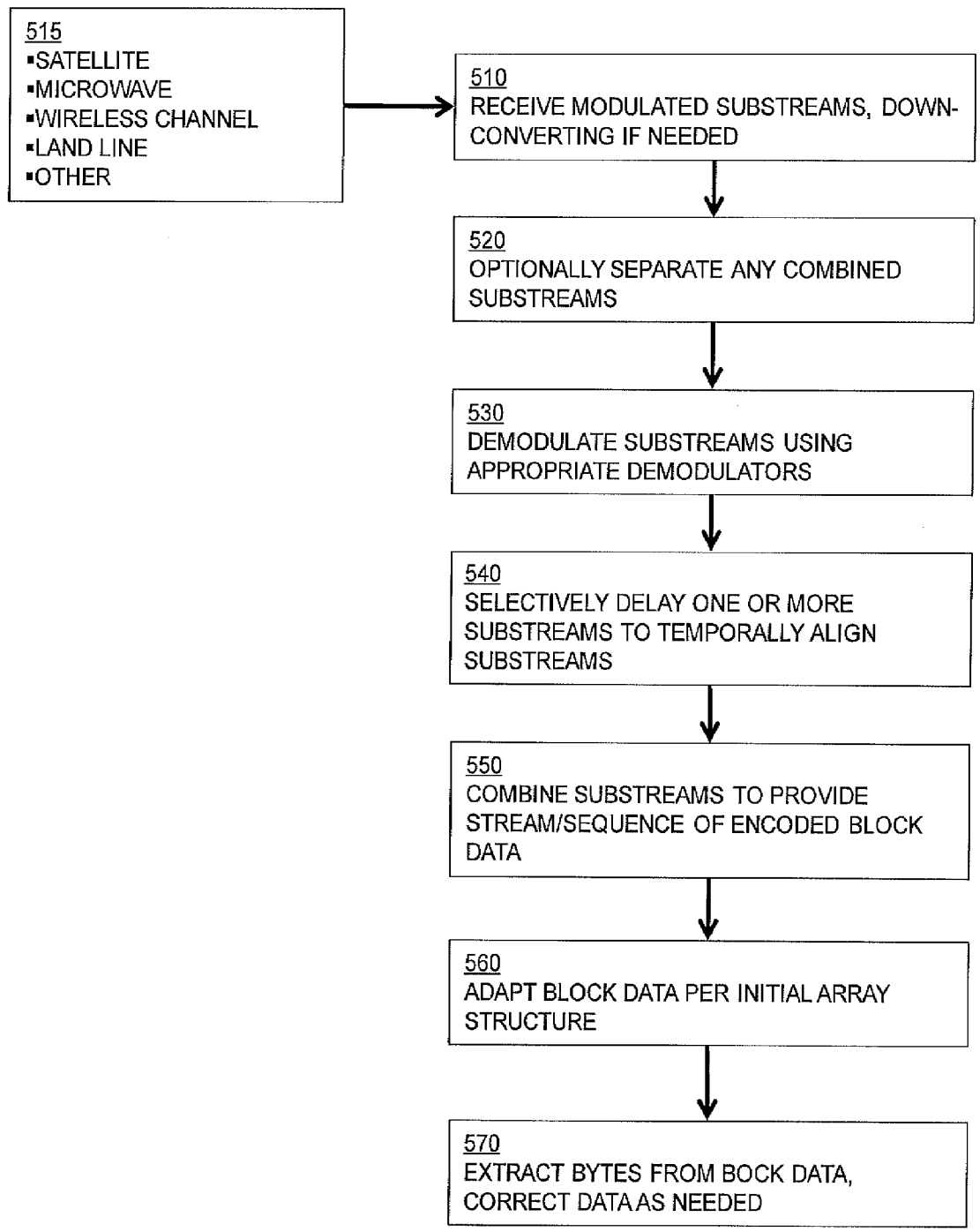
FIG. 5 depicts a flow diagram of a method according to one embodiment.

FIG. 5 depicts a flow diagram of a method according to one embodiment. Specifically, the method 500 of FIG. 5 is suitable for processing one or more received substreams, such as described above with respect to FIG. 1. Generally speaking, the method 500 of FIG. 5 provides a receiver function operating in a substantially inverse manner to the transmitter function described above with respect to the method 300 of FIG. 3. Any non-inverse functions presented herein with respect to either one of the two methods 300, 500 comprises an alternate embodiment of that method, which embodiment is also contemplated to be implemented in the other one of the two methods 500, 300.

At step 510, one or more modulated substreams are received and, if necessary, down converted. Referring to box 515, the one or more data streams may be received via satellite link, microwave link, wireless channel, wireline channel and/or other means.

At step 520, any substreams previously combined at the transmitter are separated to provide individual substreams, and at step 530 each of the individual substreams is demodulated using an appropriate demodulator.

At step 540, one or more of the demodulated substreams are selectively delayed so that the resulting demodulated data streams may be temporally aligned.

It is noted that the functions described herein with respect to steps 510-530 may be performed by, illustratively, receiver modules 160 such as described above with respect to FIG. 1. Similarly, step 540 may be performed by any functional element including sufficient buffering/timing circuitry, such as various embodiments of the receiver module 160 and/or combiner 170 described above with respect to FIG. T.

At step 550, the demodulated and selectively delayed substreams are combined to provide a resulting stream or sequence of encoded block data, such as a sequence of FEC blocks including therein noncontiguous or sequential portions of an initial data stream D.

At step 560, the block data is adapted per the initial array structure used to establish the block data. That is, the block data may be adapted according to the memory array structure, pointer array structure or other structure used to group non-sequential data portions for FEC coding.

At step 570, bytes, words, packets or other sequential data portions of the input data stream D are extracted from the FEC coding blocks and corrected as needed, such as described in the various embodiments.

As previously noted with respect to the two-dimensional array embodiments, CRC data associated with each row of contiguous or sequential data portions is useful for indicating that an error exists within that row. Upon determining that an error in a row exists, FEC data associated with the various rows may be used to replace row data such that the error is corrected.

Generally speaking, the above-described embodiments are described within the context of a two dimensional array of storage elements, pointers (or pointers thereto) wherein sequential data stream portions (e.g., contiguous words, bytes, packets etc.) are associated with (stored in or pointed to) respective elements within the array of elements. Non-sequential element groups are defined (e.g., column-related elements rather than row-related elements) to include thereby non-sequential data stream portions which are processed via FEC. This results in a sequence of FEC blocks that are effectively interleaved with respect to the underlying data stream order. The FEC blocks are sequentially arranged as, illustratively, a stream of blocks and divided into substreams comprising respective portions of the sequence of FEC blocks. Each substream is then processed for transmission via one (or more) of a plurality of transmission channels.

The array may be a one dimensional array, three dimensional array or other type of structure. Various embodiments contemplate storing or arranging groups (e.g., rows) of sequential or contiguous data portions of a data stream D with respective CRC data, and FEC coding groups (e.g., columns) of non-sequential or non-contiguous data portions to provide FEC blocks, which blocks are then arranged for transmission as a stream or sequence of blocks, which stream or sequence is further sliced or segmented into substreams or subsequences of blocks, which are then transmitted via various transmission channels toward a receiver. The receiver performs inverse processes to recover the original data stream D.

Transmitter/Receiver Synchronization

In various embodiments, interleaver synchronization between the transmitting and receiving systems may be provided by using sequence numbers within the transmitted packet structure. The sequence numbers may be generated by the slicer 130 when slicing the data stream D into segments, and used by the combiner 170 when recombining the segments into the data stream D.

For example, packets with the condition (sequence_number modulo N)==0 are mapped to row 0 of the interleaver. Subsequent packet sequence numbers are mapped to successive rows. The slicer may assign sequence numbers 0 through Q where $Q=K'+(N-K)-1$. Thus rows comprising user data bytes, Sij, receive sequence number 0 ... K'–1 while rows comprising parity bytes receive sequence numbers K' ... Q.

Once all rows from the interleaver matrix have been transmitted, the slicer sets its next available sequence number to N. Similarly, for the third set of packets from the interleaver, the starting sequence number is 2*N, and so on. The starting sequence number may wrap to 0 after iteration k if (k*N+Q) exceeds the maximum sequence number supported by the number of bits utilized by the VSA slicer for conveying sequence numbers of packets.

In other embodiments, different synchronization techniques may be used for determining how packets are stored in the de-interleaver, but the overall FEC technique described here still applies.

In various embodiments, such as a system where N stays constant (e.g., 256), the value, K, may be adjusted to vary the degree of error-protection required. Reducing K increases the error-protection capability. For example, N and K may be fixed. Adjusting the value of K' (and hence $Z=K-K'$) is an alternative method for adjusting the FEC rate. The effective FEC rate is thus $(K-Z)/(N-Z)$. By increasing Z (the number of zero-padded rows that are not transmitted) the effective FEC rate is reduced (i.e., FEC is made stronger) because a greater proportion of the transmitted payload constitutes error-protection parity bytes. In these embodiments, where Z can be adjusted in, illustratively, step sizes of 1, a very fine-grained FEC code rate scheme is provided. For an example, if N is 256 and K is 224, the effective FEC rate can be adjusted anywhere from 224/256 (same as rate 7/8), 223/255, 222/254, etc. Note that this fine-rate adjustment does not increase the complexity of the encoder and is relatively simple to implement.

In various embodiments, the FEC coding parameters are adapted in response to the number of transmission channels or links P used to transfer the various slices through the media 150. For example, as the number of links increases, the overhead attributable to FEC coding may be decreased.

Unfortunately, channel impairments may prevent delivery of the packets on one or more transmission links at any given time. Some of the more commonly found channel impairments are (1) Noise and interference in RF signals used for wireless transmission; (2) equipment failure either in the transmitter or the receiver for one of the P transmission links; and buffer congestion (such as in IP routers or switches) resulting in packet drops in one of the intermediate nodes of a wireline network used for the P transmission links.

In various embodiments, the multiple receiver instances, Rx0 . . . RxP-1, receive packets transmitted by the slicer and provide those packets to the Combiner for reconstituting the data stream, D. Packets arriving at the combiner are re-ordered based on, illustratively, the sequence numbers found in them. Control and null packets that may have been introduced by specific transmission elements (such as DVB-S2 modulators in case of satellite links) are filtered by the VSA Combiner. The combiner provides received packets and their associated sequence numbers to the FEC Decoder/De-interleaver block.

In various embodiments, the FEC decoder/de-interleaver 180 waits for the arrival of a sequence number matching the synchronization criteria for the first row packet described in the transmitter section earlier. Packets may be stored in the de-interleaver memory array starting at the first row (illustratively a row 0). Rows corresponding to missing sequence numbers may be filled with nulls or zeros. These rows constitute erasures, and a missing packet results in one erasure location per columnar FEC block. The erasure rows are noted as their locations are useful in reconstructing the missing bytes when the FEC decoder is invoked.

As previously noted, various embodiments utilize (sequence number modulo N)=[0 . . . K'-1] corresponding to user data bytes, and these are stored, respectively, in rows [0 . . . K-1] of the de-interleaver memory. Sequence numbers modulo N=K' . . . Q may be used for packets containing parity bytes and are stored in rows K . . . N-1, respectively. Z rows corresponding to zero-padded bytes remain unaffected.

In various embodiments, when a packet for any of the rows in [0 . . . K'—1] is received by a receiving module 160, the optional CRC byte, Ci, if present in the packet, is checked. The packet is transmitted to the end user node, B, immediately if the CRC check passes. This direct transmission of received bytes to the end user may be denoted as FEC Bypass. This ensures a very low latency when channel conditions are good. If CRC checks for all user data rows pass, no further checks are necessary in the current iteration of the de-interleaver memory, and we go to step 5 to start the next iteration. If a CRC check for any packet fails or a missing sequence number is noticed for any of the user-byte rows, FEC Bypass is halted for all subsequent packets for that iteration of the FEC interleaver memory. This is necessary to reconstruct the errored/incorrect bytes or missing packets.

It will be noted that a missing packet appears as error bytes spanning all columns of the interleaver memory. Because each column is treated as a separate block of input for the FEC decoder, the actual impact of a missing packet is very small as only a single erasure byte needs correction in each column. In the various embodiments discussed herein, the FEC decoder/de-interleaver is applied column-wise to reconstruct missing bytes.

Generally speaking, the number of corrected bytes depends on the specific FEC decoder used. For e.g., if the Reed-Solomon/BCH decoder is used, N-K parity bytes allow correction of up to (N-K)/2 errored/incorrect bytes or (N-K) erasures in each column. Stated differently, up to N-K lost packets for each set of Q packets that make up an iteration through the de-interleaver memory are reconstructed successfully.

The various embodiments discussed herein provide significant flexibility in designing wireless and wireline transmission networks employing multiple transmission links. Error protection may be designed for a wide range of conditions such as hitless reconstruction of the occasional dropped packet (due to network congestion) all the way to hitless delivery of user stream D even in the presence of a physical link outage for an extended duration.

The various embodiments find particular applicability within the context of highly resilient transmission in wireless networks.

As an example, consider a wireless transmission scheme employing P disjoint spectral slices of equal bandwidth W resulting in a total spectrum usage of P*W. These spectral slices may be used in various applications such as point-to-point microwave transmission or for satellite communications, etc. Assume each of the spectral slices is aggregated using the VSA aggregation scheme. We use the highest FEC rate (i.e., lowest error-correction overhead) for the physical layers of each of the transmission links that results in a bit-error-rate exceeding the Quasi Error Free (QEF) threshold. Assume a multi-carrier FEC scheme according to the following parameters: N=256; K=240; Z=0; M=184 with CRC checks for each row disabled; and FEC coding scheme=Reed Solomon. This arrangement can tolerate N-K=16 lost packets for every 256 transmitted packets without resulting in any bit errors at the user node B. Additional protection can be enabled by increasing the value of Z. Protection may be reduced by selecting a higher value of K if the transmission links are considered reliable.

As another example, consider a very resilient system that can withstand a physical link outage for an indefinite duration and experience no packet loss or bit errors. Assume P transmission links of equal capacity; set K=N*(P-1)/P; this implies that N-K=N/P lost packets per iteration through the FEC de-interleaver block can be reconstructed successfully. Since each link is of equal capacity, each link effectively carries 1/P of the total traffic which matches the effective number of erasures (as a fraction of the total data being transmitted) that can be tolerated. This arrangement effectively provides a FEC rate of (P-1)IP to allow reconstruction of all packets in a link suffering a complete outage for an indefinite duration. If P is 4, that translates to a code rate of only 3/4. If P is 8, the FEC rate is effectively 7/8, and so on.

The various embodiments provide significant coding gain improvement. Specifically, in a traditional single-carrier wireless system employing a symbol rate of E symbols per second, a strong noise source lasting for a finite duration, T, can completely wipe out (corrupt) E*T symbols. This also applies to wireline systems where the number of packets lost is directly proportional to the duration of the noise source.

In a system that employs multiple transmission links based on either different wireline links (or disjoint spectral blocks for wireless systems), a given band-limited noise source is likely to affect only one transmission channel or link at any given time. Multiple physical links (or spectral blocks) may be impacted simultaneously, but the probability is much lower. If all spectral slices are of equal bandwidth, they effectively carry E/P symbols per second, where P is the number of spectral slices. The same noise source that corrupted E*T symbols in a single-carrier system now corrupts only E*T/P symbols. For the same FEC coding rate across both single-carrier and multi-carrier systems, the error-protection capability is now effectively improved by a factor of 10*log(P) dB.

Spectral Fragment Allocation Embodiments

Various embodiments described herein may be adapted to use virtual spectrum allocation (VSA) techniques and, optionally, various resiliency enhancing techniques such as described in more detail in U.S. patent application Ser. No. 13/471,504, filed May 15, 2012, entitled "SYSTEM AND METHOD PROVIDING RESILIENT DATA TRANSMISSION VIA SPECTRAL FRAGMENTS" which is incorporated herein by reference in its entirety.

Briefly, various embodiments described above optionally utilize an efficient and general-purpose technique for aggregating multiple, fragmented blocks of wireless spectrum into one contiguous virtual block such that the cumulative bandwidth is almost equal to the sum of the bandwidths of the constituent blocks. The fragmented blocks are optionally separated from each other by blocks of spectrum, such as guard blocks, blocks owned by other parties, blocks prohibited by the wireless spectrum regulatory authority of a region or country and so on. The spectral fragments are modulated or upconverted onto one or more carrier signals C such that the spectrum associated with the modulated carrier signal C is logically or virtually divided into the plurality of spectral fragments used to convey the modulated data substreams.

A spectral fragment allocation table or other data structure is used to keep track of which spectral fragments have been defined, which spectral fragments are in use (and by which data substreams), and which spectral fragments are available. Generally speaking, each transponder/transmission channel may be divided into a plurality of spectral fragments or regions. Each of these spectral fragments or regions may be assigned to a particular data substream. Each of the data substreams may be modulated according to a unique or common modulation technique.

One or more satellite transponders or other carrier signal transmission mechanisms may be used to transmit carrier signals having spectral fragments modulated thereon between transmitter modules and receiver modules via a single satellite, multiple satellites, or other combinations/types of carrier signal transmission means.

Figure 6:
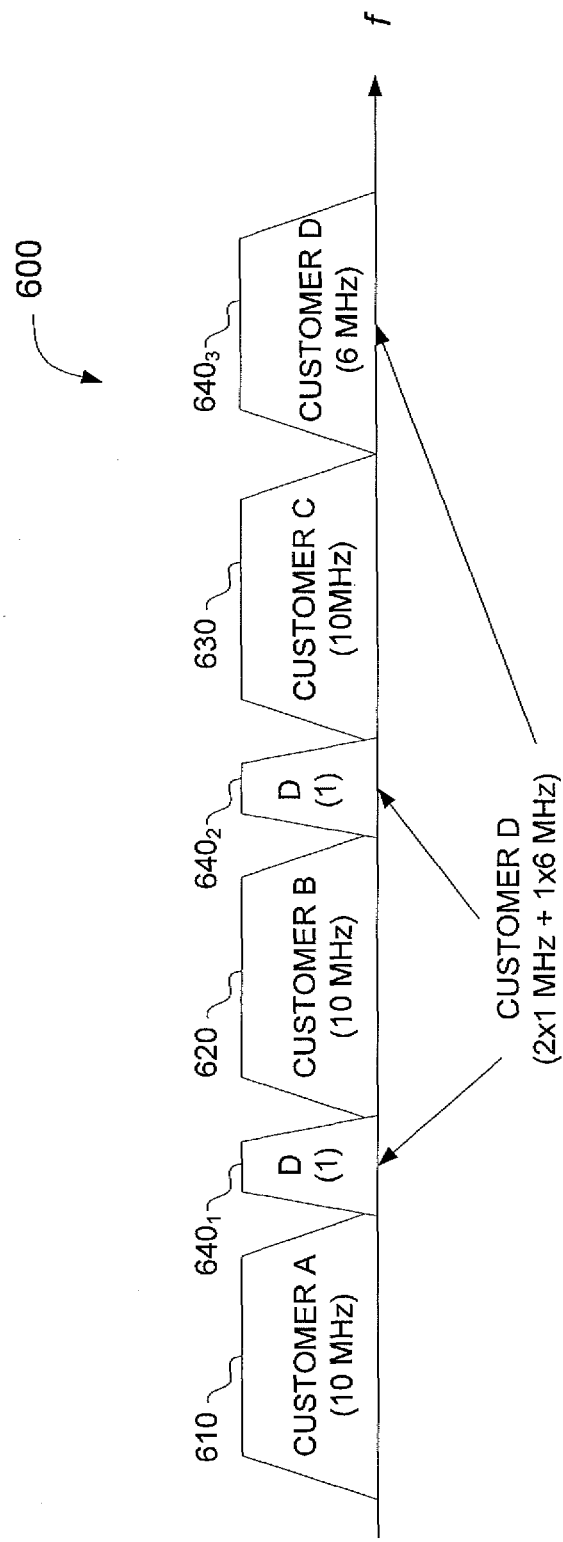
FIG. 6 depicts a graphical representation of a spectral allocation useful in understanding the various embodiments.

FIG. 6 depicts a graphical representation of a spectral allocation useful in understanding the various embodiments. Specifically, FIG. 6 graphically depicts a 36 MHz spectral allocation in which a first customer is allocated a first portion 610 of the spectrum, illustratively a single 10 MHz block; a second customer is allocated a second portion 620 of the spectrum, illustratively single 8 MHz block; a third customer is allocated a third portion 630 of the spectrum, illustratively single 10 MHz block; and a fourth customer is allocated is allocated a fourth portion 640 of the spectrum, illustratively three noncontiguous spectrum blocks comprising a first 1 MHz block $640_1$, a second 1 MHz block $640_2$ and a 6 MHz block $640_3$.

Within the context of the various embodiments discussed herein, the data stream associated with the fourth customer is divided into two different 1 MHz spectral fragments in a single 6 MHz spectral fragment, each of which is processed in substantially the same manner as described above.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   associating, by an apparatus comprising one or more computer devices, sequential data stream portions of a data stream with respective elements within an array of elements;
   defining, by the apparatus, a plurality of element groups, each element group comprising a plurality of elements including non-sequential data stream portions of the data stream;
   forward error correction (FEC) encoding, by the apparatus, each of the element groups to form respective FEC blocks;
   dividing, by the apparatus, the encoded FEC blocks into a plurality of substreams;
   associating, by the apparatus, each substream with a respective transmission channel; and
   providing, by the apparatus, parameters for modulating each substream to generate a respective modulated signal adapted for transmission via the respective transmission channel.

2. The method of claim 1, wherein the array elements comprises a two-dimensional array having M columns and N rows, where M and N are finite integers greater than one.

3. The method of claim 2, wherein sequential data stream portions are stored sequentially across each of K rows, where K is a finite integer greater than two.

4. The method of claim 2, wherein each element group comprises elements within a common column in the array of elements.

5. The method of claim 4, wherein each element group comprises K elements within the same column of elements in the array of elements, where K is a finite integer greater than one.

6. The method of claim 1, further comprising:
   calculating a circular redundancy check (CRC) for the sequential data stream portions associated with a predefined number of elements; and
   associating the calculated CRC with an array element.

7. The method of claim 6, wherein the predetermined number of elements equals M−1.

8. The method of claim 1, wherein at least some of the modulated signals are adapted for transmission via respective portions of a first upconverted carrier signal.

9. The method of claim 8, wherein at least some of the modulated signals are adapted for transmission via respective portions of a second upconverted carrier signal.

10. The method of claim 9, wherein the first and second carrier signals are conveyed using corresponding first and second point-to-point links.

11. The method of claim 10, wherein the first and second point-to-point links comprise satellite transmission links, microwave transmission links or optical transmission links.

12. The method of claim 9, wherein the first and second carrier signals are conveyed using corresponding first and second point-to-multipoint links.

13. The method of claim 1, wherein at least some of the modulated signals are adapted for transmission via respective wireless channels within a 3G, 4G or Wi-Fi communications network.

14. The method of claim 1, wherein each of said respective transmission channels is associated with a common transport infrastructure.

15. The method of claim 1, wherein each respective transmission channel is associated with a corresponding spectral fragment.

16. A non-transitory computer readable medium including software instructions which, when executed by one or more processors, perform a method comprising:
associating sequential data stream portions of a data stream with respective elements within an array of elements;
defining a plurality of element groups, each element group comprising a plurality of elements including non-sequential data stream portions of the data stream;
forward error correction (FEC) encoding each of the element groups to form respective FEC blocks;
dividing the encoded FEC blocks into a plurality of substreams;
associating each substream with a respective transmission channel; and
providing relevant parameters for modulating each substream to generate a respective modulated signal adapted for transmission via the respective transmission channel.

17. A computer program product, wherein at least one computer is operative to process software instructions which adapt the operation of the at least one computer to perform a method comprising:
associating sequential data stream portions of a data stream with respective elements within an array of elements;
defining a plurality of element groups, each element group comprising a plurality of elements including non-sequential data stream portions of the data stream;
forward error correction (FEC) encoding each of the element groups to form respective FEC blocks;
dividing the encoded FEC blocks into a plurality of substreams;
associating each substream with a respective transmission channel; and
providing relevant parameters for modulating each substream to generate a respective modulated signal adapted for transmission via the respective transmission channel.

18. An apparatus, comprising:
an encoder, configured to receive a data stream, to associate sequential data stream portions of the data stream with respective elements within an array of elements, to define a plurality of element groups, each element group comprising a plurality of elements including non-sequential data stream portions, and to forward error correction (FEC) encode each of the element groups to form respective FEC blocks; and
a slicer, configured to divide the sequence of FEC blocks into a plurality of substreams, and to associate each substream with a respective transmission channel,
wherein the apparatus is further configured to provide relevant parameters for modulating each substream to generate a respective modulated signal adapted for transmission via the respective transmission channel.

19. A method, comprising:
demodulating, by an apparatus comprising one or more computing devices, each of modulated substreams of a data stream, each substream being received on a respective transmission channel by the apparatus;
selectively delaying, by the apparatus, one or more substreams of the received substreams to temporarily align the received substreams;
combining, by the apparatus, the demodulated and temporarily aligned substreams to recover encoded forward error correction (FEC) blocks including non-sequential data stream portions of an initial data stream; and
extracting, by the apparatus, the sequential data stream portions from the FEC blocks.

20. The method of claim 19, wherein extracting the sequential data stream portions from the FEC blocks includes storing the FEC blocks in a two-dimensional array having M columns and N rows such that sequential data stream portions are stored sequentially across each of K rows, where M and N are finite integers greater than one, and K is a finite integer greater than two.

21. The method of claim 20, further comprising performing a circular redundancy check (CRC) for each of the K rows of sequential data stream portions to identify any errors, and using the FEC encoding to correct identified errors.

22. An apparatus, comprising;
at least one processor; and
at least one memory for storing program logic, the program logic executed by the at least one processor, the program logic comprising:
logic for demodulating each of modulated substreams of a data stream, each substream being received on a respective transmission channel by the apparatus;
logic for selectively delaying one or more substreams of the received substreams to temporarily align the received substreams;
logic for combining the demodulated and temporarily aligned substreams to recover encoded forward error correction (FEC) blocks including non-sequential data stream portions of an initial data stream; and
logic for extracting the sequential data stream portions from the FEC blocks.

* * * * *